Figure 1:
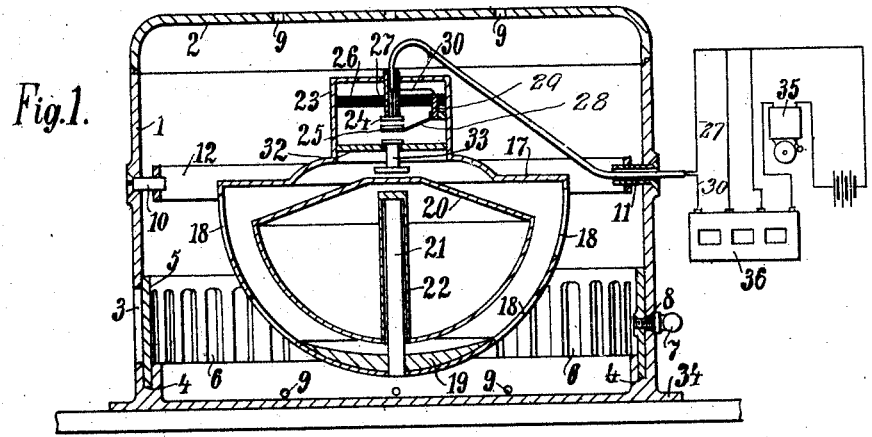

No. 875,040. PATENTED DEC. 31, 1907.
C. BERGSTRÖM.
AUTOMATIC LEAK INDICATOR FOR SHIPS.
APPLICATION FILED JULY 5, 1907.

UNITED STATES PATENT OFFICE.

CHARLES BERGSTRÖM, OF TAMMERFORS, RUSSIA.

AUTOMATIC LEAK-INDICATOR FOR SHIPS.

No. 875,040.　　Specification of Letters Patent.　　Patented Dec. 31, 1907.

Application filed July 5, 1907. Serial No. 382,342.

*To all whom it may concern:*

Be it known that I, CHARLES BERGSTRÖM, subject of the Russian Emperor, residing at Tammerfors, in Finland, Russia, have invented certain new and useful Improvements in Automatic Leak-Indicators for Ships, of which the following is a specification.

This invention relates to an apparatus by means of which the entrance of water through a leak can be automatically indicated on ships so that the necessary precautions can immediately be taken, thus enabling the leak to be stopped and all steps to be taken for saving the vessel.

In the drawings two embodiments of my invention are represented.

Figure 2:
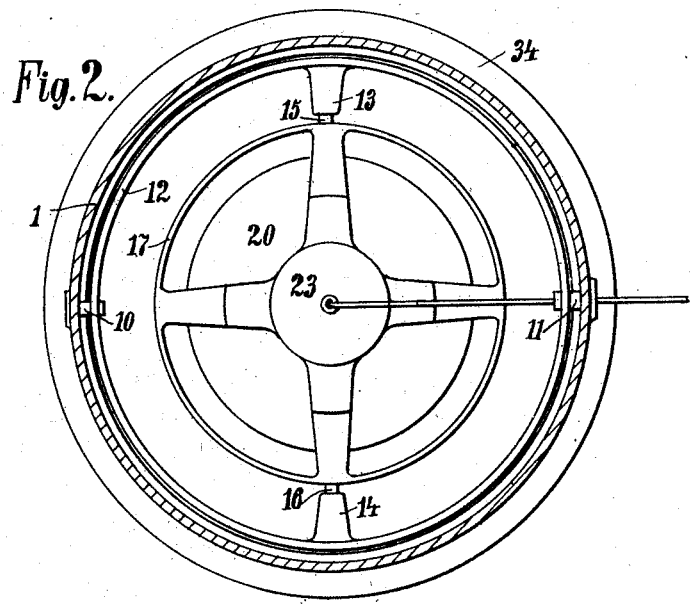
Figure 3:
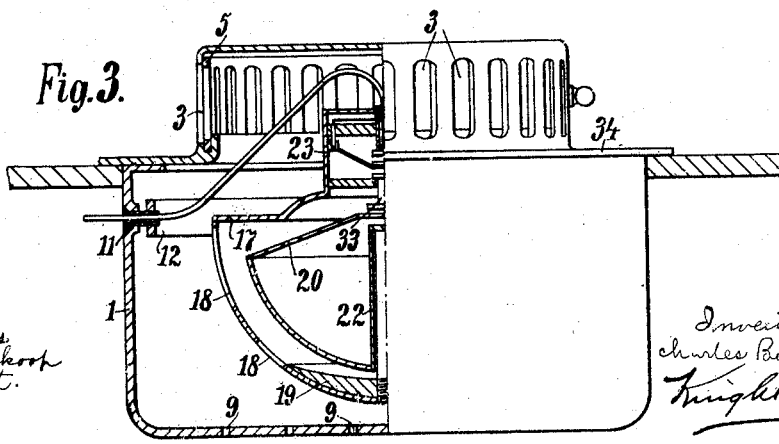

Figures 1 and 2 show the first form in vertical section and part sectional plan respectively, while Fig. 3 illustrates the second form, the right half of said figure being in side elevation and the left side being in vertical section.

As is obvious from the drawing 1 is a casing closed above by means of the cover 2. This casing 1 possesses below the flange 34 and is provided at its lower part with a series of slots 3. In the interior of the casing a ring 5 is revolubly supported at 4, said ring possessing slots 6. Moreover a knob 7 is fixed on the ring 5, said knob being displaceable in a slot 8 in the casing 1. By means of said knob 7 the ring 5 can be rotated so that its slots 6 correspond or coincide with the slots 3 in the casing or so that the portions or bridges situated between the slots in the ring 3 cover the slots in the casing 3 and consequently shut off the interior of the casing from the exterior. The cover and the bottom of the casing may be provided with small air holes 9. Two pivots 10, 11 are secured on the wall of the casing 1 inside the latter upon which pivots the ring 12 is supported so that it can oscillate. Inside the ring 12 the two bearings 13, 14 are provided in which the pivots 15, 16 of the basket 17 are supported. By this method of supporting the ring 12 on the pivots 10, 11 and the pivots 15, 16 in the bearings 13, 14 the basket 17 is provided with a suspension which is known by the name Cardan's rings or Cardan's suspension. This suspension enables the basket 17 not to follow the ship's oscillatory movements but to retain always its vertical position. The basket 17 possesses several slots 18 and is below, that is at 19, charged with lead in order to increase its weight. In the basket 17 a float 20 is arranged adapted to be longitudinally displaced on the guide-rod 21 fixed to the bottom of the basket 17 for which purpose it is provided centrally with the tube-like member 22. The interior of the float 20 is preferably closed air-tight.

The basket 17 terminates in a receptacle 23 which is provided with two electric contacts 24, 25. The contact 24 is attached to the plate of insulation 26 and is connected with the insulated conductor 27. The contact 25 by means of a spring 28 is fixed to the piece 29 and is connected with the conductor 30 which is also insulated, said conductor being united with the conductor 27 to form a cable. The conductors 27, 30 pass through the pivot 11 to an alarm-device 35, 36 (electric bell, electric horn or the like) arranged in a suitable place on the ship. In the portion 32 of the receptacle 23 an intermediate piece 33 is suspended axially movable in such a way that its axis approximately coincides with the axis of the receptacle 23 and with that of the contacts 24, 25. The whole apparatus is supposed to be mounted at the lowest parts in the ship and particularly at places where the danger of the springing of leaks is greatest. The operation of the apparatus is as follows:—In case the ship springs a leak and the lowest part where the apparatus has been set up is flooded with water, the water penetrates through the slots 3 in the casing into the interior of the latter and then passes through the slots 18 to the float 20. In proportion as the water rises the float 20 is lifted and consequently displaces the intermediate piece 33 and forces the contact 25 which is normally held down under the influence of the spring 28 against the contact 24, whereby the circuit containing the conductors 30, 27 is closed and the alarm device 35, 36 set in action. In case the portion of the ship in which the apparatus is arranged is to be cleaned the ring 5 is shifted by means of a knob 7 in such a way that the slots 3 in the casing are covered by the portions or bridges between the slots in the ring 5. In this manner the water employed for cleaning and swabbing is prevented from entering the apparatus and making the same dirty. It is obvious that several such apparatuses may be arranged at different parts on the ship and that the alarm or signaling devices set in action by the apparatuses may be numbered and mounted if desired on one and the same board 36 so that, on one of the bells ringing the number of the apparatus corresponding thereto can at once be distinguished and consequently also the place on the ship where the water entering through the leak has made its appearance.

The electric pumps situated on a ship provided with apparatus according to the present invention may be automatically switched in by the alarm apparatus in which case much time is saved.

The form represented in Fig. 3 is distinguished from the form described above merely by the attachment flange 34 being arranged not below but above in the casing 1 and also by the slots 3 left free or covered over by the ring 5 being in the uppermost part of the casing, whereas in the case of the former apparatus as shown in Figs. 1 and 2 by virtue of the arrangement of the attachment-flange 34 it is possible to set the apparatus up in the lower parts of the ship, the form shown in Fig. 2 permits of the apparatus being placed in the upper parts of the ship, and in particular enables the apparatus to be sunk up to its attachment-flange in the flooring of the ship. Otherwise the arrangement shown in Fig. 3 agrees exactly with the form shown in Figs. 1 and 2 for which reason the corresponding parts in the two figures have been given the same reference numerals.

Having now fully described my invention I declare that what I claim is:—

1. In automatic leak-indicator for ships the combination of a casing, a float suspended in said casing by means of a Cardan's suspension, means for opening and shutting off access to said casing and electric contacts adapted to be closed by said float.

2. In automatic leak-indicator for ships the combination of a casing, a float suspended in said casing by means of a Cardan's suspension, means for opening and shutting off access to said casing and electric contacts adapted to be closed on said float rising by the water entering said casing.

3. In automatic leak-indicator for ships the combination of a casing, provided with slots at its circumference, a revoluble ring in said casing also provided with slots adapted to open and close said slots in said casing, a float suspended in said casing by means of a Cardan's suspension and electric contacts adapted to be closed on said float rising by the water entering said casing.

4. In automatic leak-indicator for ship the combination of a casing provided at its circumference with slots, a revoluble ring in said casing also provided with slots adapted to open and close said slots in said casing, of horizontal pins oppositely arranged in regard to each other, a ring revolubly supported on said pins, of pins provided in said latter ring at right angles to said first pins and a basket revolubly supported on said latter pins provided with openings for the access of water, a float in said basket adapted to move up and down therein and electric contacts adapted to be closed by said float.

5. In automatic leak-indicator for ships the combination of a casing provided at its circumference with slots, a revoluble ring in said casing also provided with slots adapted to open and close said slots in said casing, a ring revolubly supported in said casing, a basket revolubly supported in said ring about an axis at right angles to the axis of revolution of said ring, a float in said basket adapted to move up and down therein and electric contacts adapted to be closed by said float.

6. In automatic leak-indicator for ships the combination of a casing provided at its circumference with slots, a revoluble ring in said casing also provided with slots adapted to open and close said slots in said casing, of horizontal pins oppositely arranged in regard to each other, a ring revolubly supported on said pins, of pins provided in said latter ring at right angles to said first pins and a basket revolubly supported on said latter pins provided with openings for the access of water, a float in said basket a guide-rod for said float adapted to move up and down thereon and electric contacts adapted to be closed by said float.

In witness whereof I have hereunto set my hand in presence of two witnesses.

CHARLES BERGSTRÖM.

Witnesses:
   Osc. Landstrom,
   J. C. Gronmark.